(12) United States Patent
Baba et al.

(10) Patent No.: US 10,971,977 B2
(45) Date of Patent: Apr. 6, 2021

(54) STATOR FOR ROTARY ELECTRIC MACHINE AND ROTARY ELECTRIC MACHINE

(71) Applicant: HITACHI AUTOMOTIVE SYSTEMS, LTD., Hitachinaka (JP)

(72) Inventors: Yuichiro Baba, Hitachinaka (JP); Taku Ito, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 59 days.

(21) Appl. No.: 15/777,768

(22) PCT Filed: Oct. 26, 2016

(86) PCT No.: PCT/JP2016/081653
§ 371 (c)(1),
(2) Date: May 21, 2018

(87) PCT Pub. No.: WO2017/090363
PCT Pub. Date: Jun. 1, 2017

(65) Prior Publication Data
US 2018/0337580 A1 Nov. 22, 2018

(30) Foreign Application Priority Data
Nov. 25, 2015 (JP) .............................. JP2015-229276

(51) Int. Cl.
*H02K 11/25* (2016.01)
*H02K 3/04* (2006.01)
*H02K 5/04* (2006.01)

(52) U.S. Cl.
CPC ............... *H02K 11/25* (2016.01); *H02K 3/04* (2013.01); *H02K 5/04* (2013.01)

(58) Field of Classification Search
CPC .................................................... H02K 11/25
(Continued)

(56) References Cited

U.S. PATENT DOCUMENTS 4,188,553 A * 2/1980 Wheaton ............ H01H 37/5436
310/68 C
4,890,025 A * 12/1989 Hadeler ................. H02K 11/25
310/68 C
(Continued)

FOREIGN PATENT DOCUMENTS

DE   102013202534 A1 *  8/2014  ............... H01F 5/02
JP   2008-131775 A        6/2008
(Continued)

OTHER PUBLICATIONS

JP-2013051807-A (English Translation) (Year: 2013).*
(Continued)

*Primary Examiner* — Quyen P Leung
*Assistant Examiner* — Alexander Moraza
(74) *Attorney, Agent, or Firm* — Foley & Lardner LLP

(57) ABSTRACT

Provided is a stator for a rotary electric machine which can suppress the mechanical effects of thermal expansion and contraction of a fixing member for fixing a temperature detector, on a temperature detection element. The stator for a rotary electric machine includes a stator coil, a temperature detection unit including a temperature detection element, a protection member extending in a longitudinal direction to cover the temperature detection unit, and a fixing member serving as a positioning mechanism for the temperature detection unit with respect to a stator coil. The fixing member includes a clamp portion for fixing the protection member, and the clamp portion clamps the protection member at a position where the clamp portion does not overlap the temperature detection element in a longitudinal direction of the protection member.

6 Claims, 9 Drawing Sheets

(58) Field of Classification Search
USPC .......... 310/68 C; 361/26–27; 337/190, 193, 337/214, 234, 253; 338/25–31
See application file for complete search history.

(56) References Cited

U.S. PATENT DOCUMENTS

| | | | | |
|---|---|---|---|---|
| 5,367,282 | A | * | 11/1994 | Clem .................. G01K 1/08 338/22 R |
| 2007/0194654 | A1 | * | 8/2007 | Rush .................. H02K 11/25 310/260 |
| 2012/0086292 | A1 | | 4/2012 | Ishida et al. |

FOREIGN PATENT DOCUMENTS

| | | | | |
|---|---|---|---|---|
| JP | 2008131775 | A | * | 6/2008 |
| JP | 2008-178222 | A | | 7/2008 |
| JP | 2011-112563 | A | | 6/2011 |
| JP | 2011223827 | A | * | 11/2011 |
| JP | 2012-057980 | A | | 3/2012 |
| JP | 2013-51807 | A | | 3/2013 |
| JP | 2013051807 | A | * | 3/2013 |
| JP | 2013-172478 | A | | 9/2013 |
| JP | 2015-053814 | A | | 3/2015 |
| WO | WO-2010/147027 | A1 | | 12/2010 |

OTHER PUBLICATIONS

JP-2011223827-A (English Translation) (Year: 2011).*
JP-2008131775-A (English Translation) (Year: 2008).*
DE102013202534A1 (English Translation) (Year: 2014).*
Office Action dated Feb. 26, 2019 in the corresponding Japanese Patent Application No. 2017-552321 with its English machine translation.
International Search Report with English translation and Written Opinion issued in corresponding application No. PCT/JP2016/081653 dated Dec. 13, 2016.

* cited by examiner

STATOR FOR ROTARY ELECTRIC MACHINE AND ROTARY ELECTRIC MACHINE

TECHNICAL FIELD

The present invention relates to a stator for a rotary electric machine and a rotary electric machine.

BACKGROUND ART

As a stator for a rotary electric machine which detects the temperature of stator windings with high precision and responsibility, the following structure is known. The stator for a rotary electric machine includes a stator core, stator windings, a neutral terminal for electrically connecting neutral points of respective phases of the stator windings, a temperature detection element, and a substantially cylindrical heat transfer unit made of metal and provided at the neutral terminal to cover a temperature detection element (e.g., see PTL 1).

CITATION LIST

Patent Literature

PTL 1: JP 2008-131775 A

SUMMARY OF INVENTION

Technical Problem

In the technology disclosed in PTL 1, the substantially cylindrical heat transfer unit made of metal covers the temperature detection element. In this structure, the substantially whole circumference of the temperature detection element is covered by the heat transfer unit made of metal. Thus, contraction of metal at low temperature may cause compression of the temperature detection element from the whole circumference by the heat transfer unit made of metal. A compressive load may cause a reduction in accuracy of temperature detection, impossibility of temperature detection, or the like due to cracks, damage, or the like in the temperature detection element. Furthermore, since the temperature detection element is only covered by the heat transfer unit, thermal expansion of metal at high temperature may generate a gap between the temperature detection element and the heat transfer unit made of metal, and the temperature detection element may drop off the heat transfer unit. That is, the thermal expansion and contraction of the fixing member tends to mechanically affect the temperature detection element.

Solution to Problem

According to a first aspect of the present invention, a stator for a rotary electric machine includes a stator coil, a temperature detection unit which includes a temperature detection element, a protection member which extends in a longitudinal direction to cover the temperature detection unit, and a fixing member which serves as a positioning mechanism for the temperature detection unit with respect to the stator coil. The fixing member includes a clamp portion which fixes the protection member, and the clamp portion clamps the protection member at a position where the clamp portion does not overlap the temperature detection element in the longitudinal direction of the protection member.

According to a second aspect of the present invention, a stator for a rotary electric machine includes a stator coil, a temperature detection element, a protection member which covers the temperature detection element, and a fixing member which serves as a positioning mechanism for the temperature detection element with respect to the stator coil. The fixing member includes a clamp portion which clamps the protection member, and an opposed portion which is opposed to the protection member to provide an air gap between the opposed portion and the protection member. The temperature detection element is disposed at a position at which the temperature detection element is opposed to the opposed portion across the air gap. According to a third aspect of the present invention, a rotary electric machine includes the stator according to the first aspect or the second aspect.

Advantageous Effects of Invention

According to the present invention, mechanical effects of thermal expansion and contraction of a fixing member on a temperature detection element can be suppressed.

DESCRIPTION OF EMBODIMENTS

First Embodiment

A first embodiment of a stator for a rotary electric machine according to the present invention is hereinafter described with reference to FIGS. 1 to 5.

Figure 1:
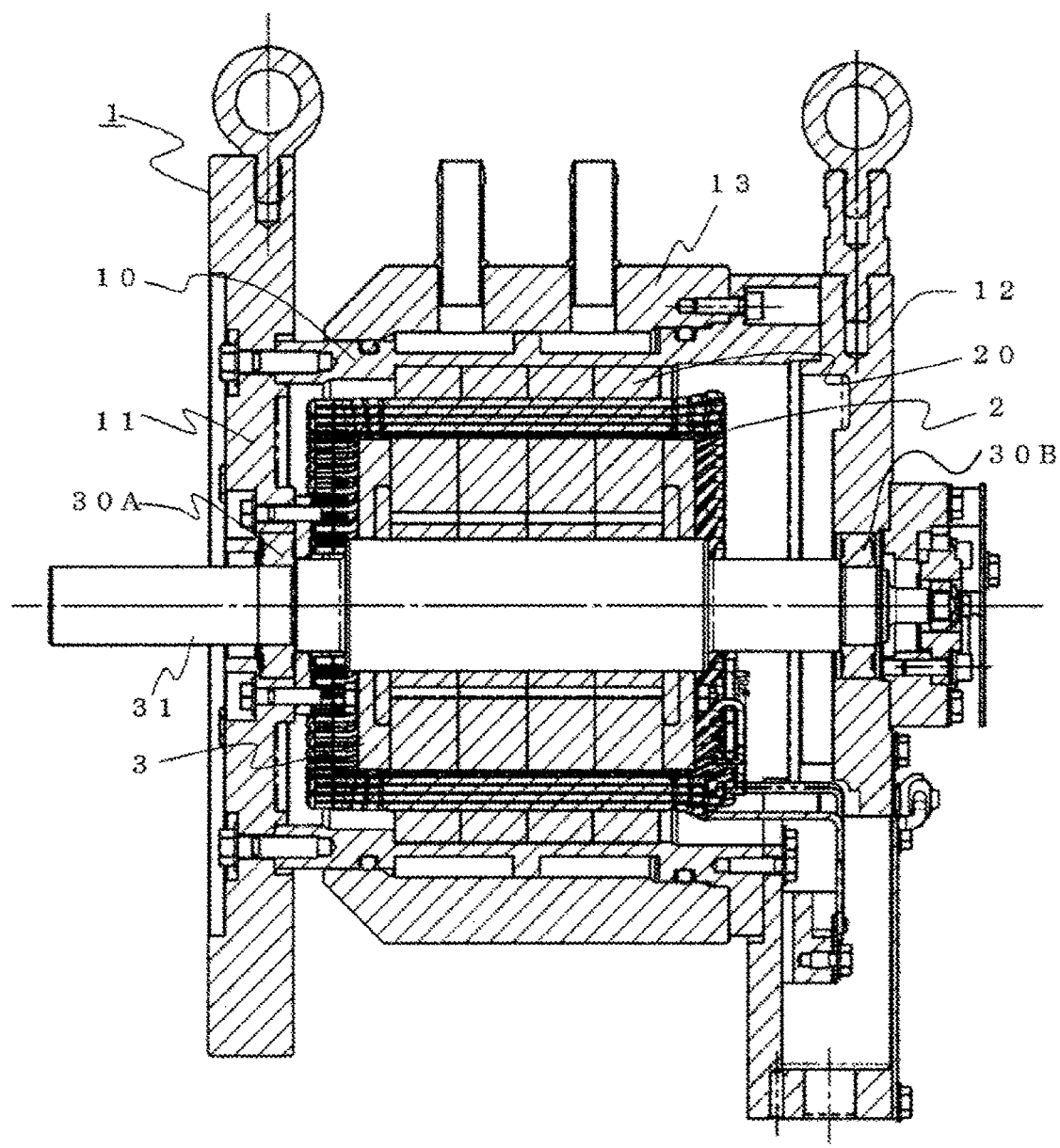
FIG. 1 is a schematic diagram illustrating an overall configuration of a rotary electric machine.

FIG. 1 is a schematic diagram illustrating an overall configuration of a rotary electric machine.

In FIG. 1, a rotary electric machine 1 is illustrated partly in cross-section to show the inside of the rotary electric machine 1.

As illustrated in FIG. 1, the rotary electric machine 1 includes a housing 10, a stator 2 having a stator core 20 fixed to the housing 10, and a rotor 3 rotatably disposed in the stator. The rotary electric machine 1 includes a casing, the casing is constituted by a front bracket 11, the housing 10, and a rear bracket 12, and the housing 10 constitutes a cooling water channel of the rotary electric machine, together with a water jacket 13.

The rotor 3 is fixed to a shaft 31 supported by a bearing 30A of the front bracket 11 and a bearing 30B of the rear bracket 12, and is rotatably held in the stator core 20.

Figure 2:
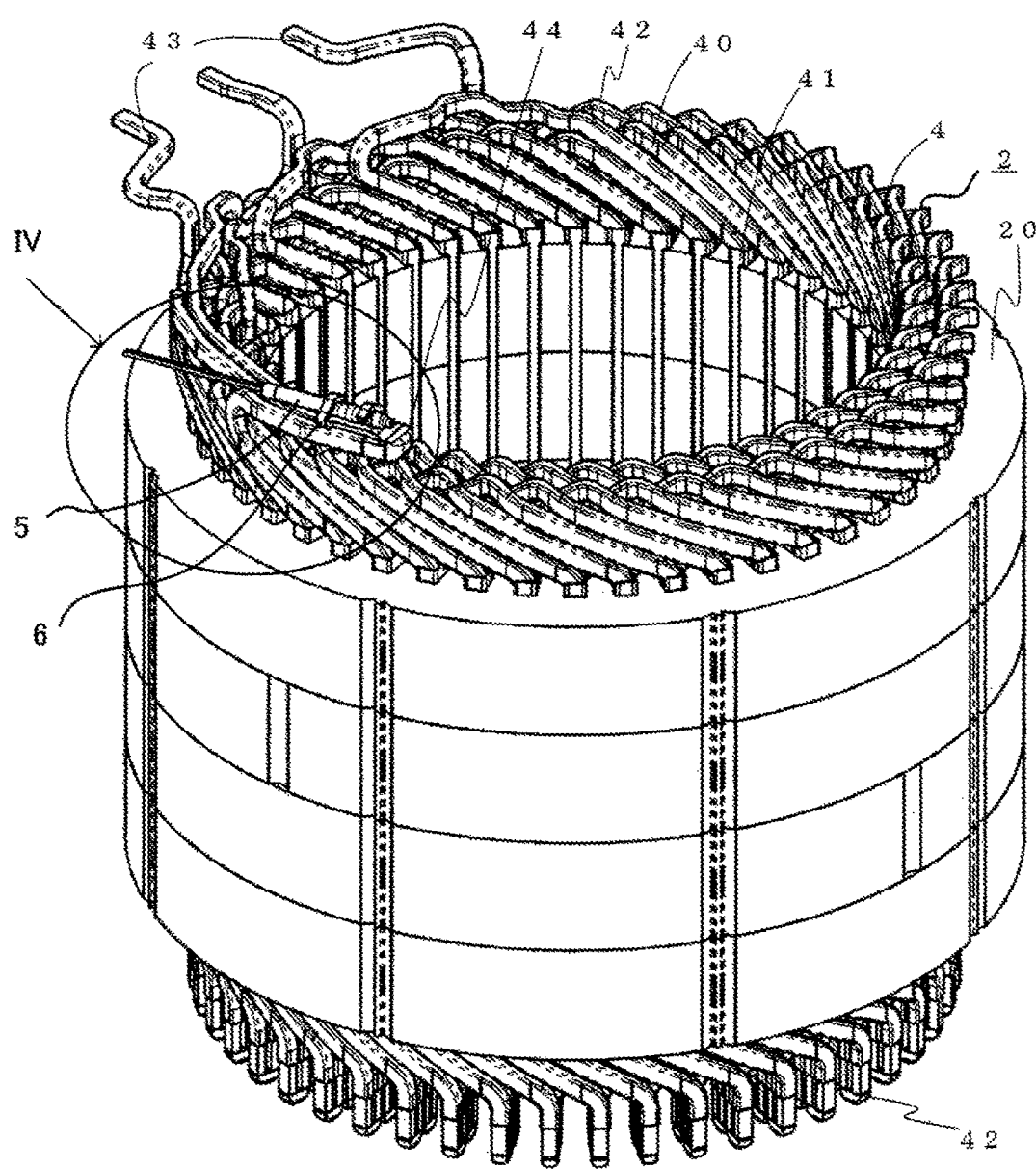
FIG. 2 is a perspective view of a stator for a rotary electric machine according to a first embodiment of the present invention.

FIG. 2 is a perspective view of the stator for a rotary electric machine according to the first embodiment of the present invention.

The stator 2 includes the stator core 20 having a plurality of slots circumferentially formed, stator windings 4, and a temperature detector 5 for measuring the temperature of the stator windings 4.

The stator core 20 is formed by axially stacking magnetic steel plates of predetermined thickness into an annular shape, and has a plurality of axial slots formed circumferentially on the inner peripheral side.

The stator windings 4, that is, a stator coil is mounted in a slot of the stator core 20 via an insulator 41 formed of an insulation resin material into a sheet shape. The stator windings 4 are constituted by axially inserting a rectangular conductor 40 formed of copper into a substantially U-shape, into a slot of the stator core 20, bending an opening side end of the rectangular conductor 40, and electrically connecting the bent portions of the rectangular conductors by welding or the like.

Welded portions of the rectangular conductor 40 are covered by insulation resin material. Since the stator windings 4 are constituted by the rectangular conductor 40, as described above, gaps between the stator windings 4 in coil ends 42 at both ends of the stator core 20 can be increased, compared with stator windings constituted by continuously multiply winding one round wire conductor. However, in the present invention, the stator windings 4 may be formed by the round wire conductor.

The stator windings 4 of FIG. 2 are windings of three-phase Y-connection, and includes U-phase stator windings, V-phase stator windings, and W-phase stator windings which are constituted by the rectangular conductor 40. The stator windings 4 of the respective phases have output terminals 43 of U-phase, V-phase, and W-phase arranged at one end, and the other ends of the stator windings 4 of the respective phases constitute a neutral point 44 to which the U-phase, the V-phase, and the W-phase are connected. Thus, a three-phase AC circuit is formed.

At the neutral point 44 of the stator windings 4, the temperature detector 5 for measuring the temperature of the stator windings 4 is fixed by a fixing member 6. A fixing structure for the temperature detector 5 will be described in detail later.

Figure 3:
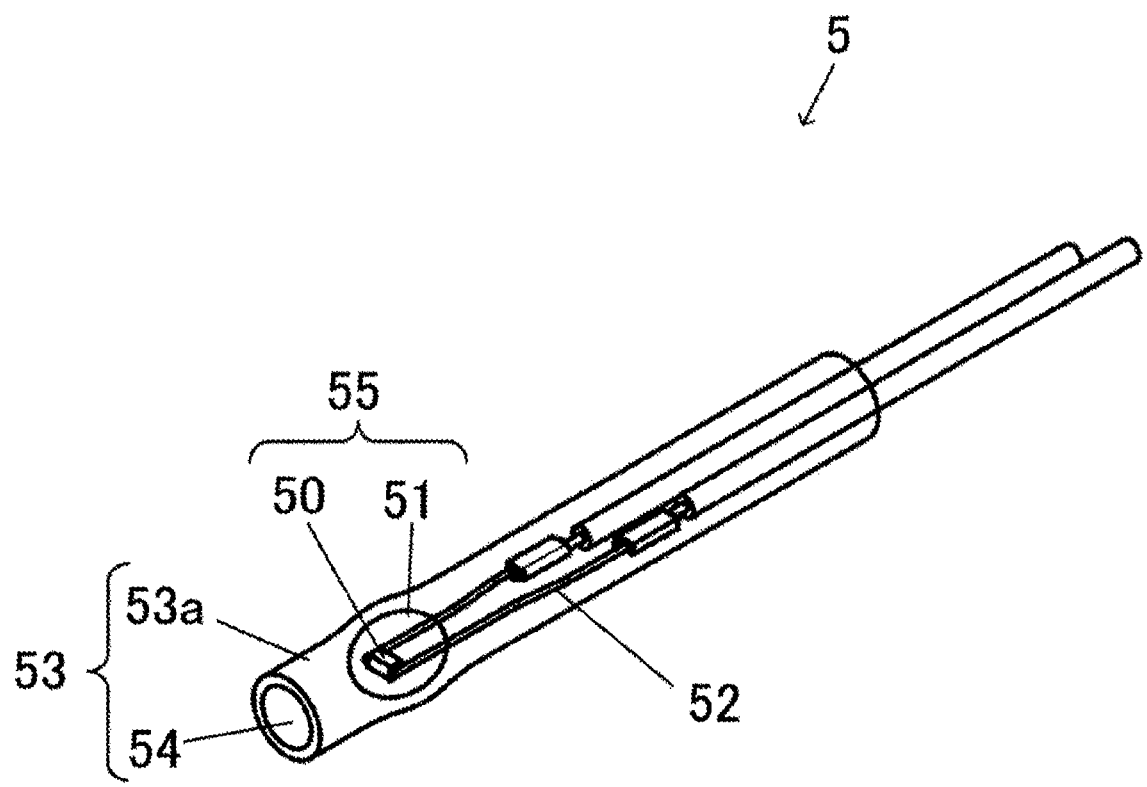
FIG. 3 is a perspective view of an exemplary structure of a temperature detector illustrated in FIG. 2.

The temperature detector 5 includes a temperature detection element 50 (see FIG. 3). The temperature detection element 50 is a temperature sensor including a semiconductor having a large variation in electrical resistance value relative to a variation in temperature. The rotary electric machine 1 includes a control unit (e.g., inverter) which monitors the resistance value of the temperature detection element 50 to detect the temperature of the stator windings 4. When the detected temperature of the stator windings 4 exceeds a defined value, the control unit restricts or terminates the performance of the rotary electric machine 1 to prevent the abnormal overheat of the stator windings 4.

The temperature of the stator windings 4 is transmitted to the temperature detector 5, the temperature of the temperature detection element 50 is changed, and the electrical resistance value of the temperature detection element 50 is changed. When heat transmission from the stator windings 4 to the temperature detector 5 is low, the change of temperature, that is, the change of resistance of the temperature detection element 50 is delayed in time relative to the change of temperature of the stator windings 4.

As described above, in a case where the change of temperature of the temperature detection element 50 is delayed in time relative to the change of temperature of the stator windings 4, for example, the performance of the rotary electric machine 1 needs to be limited or the defined value of the temperature of the stator windings 4 needs to be set smaller, in accordance with the delay in time to prevent the overheat of the stator windings 4. However, such a configuration leads to insufficient performance of the rotary electric machine 1. For sufficient performance of the rotary electric machine 1, the temperature following property of the temperature detection element 50 to the stator windings 4 needs to be ensured.

FIG. 3 is a perspective view of an exemplary structure of the temperature detector illustrated in FIG. 2. A structure of the temperature detector disposed at the stator windings 4 is described with reference to FIG. 3.

The temperature detector 5 includes, for example, the temperature detection element 50, a sealing member 51 for sealing the temperature detection element 50, a wire 52 connected to the temperature detection element 50, and a protection member 53. The temperature detection element 50 is constituted by a semiconductor including a sintered transition metal oxide including nickel, cobalt, or manganese. The sealing member 51 is formed of a hard material, such as, glass. The temperature detection element 50 and the sealing member 51 constitute a temperature detection element unit 55. For example, the protection member 53 is structured so that a resin 54, such as epoxy resin, for covering the temperature detection element unit 55 is enclosed in an insulation cover 53a formed of a resin or the like. The protection member 53 is formed into a shaft shape extending linearly along the wires 52 to cover a pair of positive and negative wires 52 connected to the temperature detection element 50. The wires 52 are connected to the control unit (not illustrated) of the rotary electric machine 1, and the control unit has a controller which monitors the resistance value of the temperature detection element 50.

Since the temperature detection element 50 is positioned in the temperature detector 5, the thermal resistance from the stator windings 4 to the temperature detector 5 is desirably small to detect the temperature of the stator windings 4 with high precision and responsibility. That is, the temperature detector 5 and the stator windings 4 are desirably brought into direct contact with each other without an air gap between the temperature detector 5 and the stator windings 4, or the temperature detector 5 and the stator windings 4 are desirably brought into contact with each other via a member having an excellent heat conductivity, such as metal, between the temperature detector 5 and the stator windings 4.

Furthermore, when a stress, such as compression, is applied to the temperature detection element unit 55 from outside, the sealing member 51 including the hard material having low elasticity or the temperature detection element may be cracked or damaged, leading to reduction in detection accuracy or disabled detection due to wrong resistance value. The protection member 53 is positioned around the temperature detection element unit 55, but the protection member 53 is also affected by heat, causing expansion or contraction, or transfer of an impact. Therefore, the temperature detection element unit 55 desirably has a structure in which no stress, such as compression, is applied to the temperature detection element unit 55 from outside, via the protection member 53.

Figure 4:
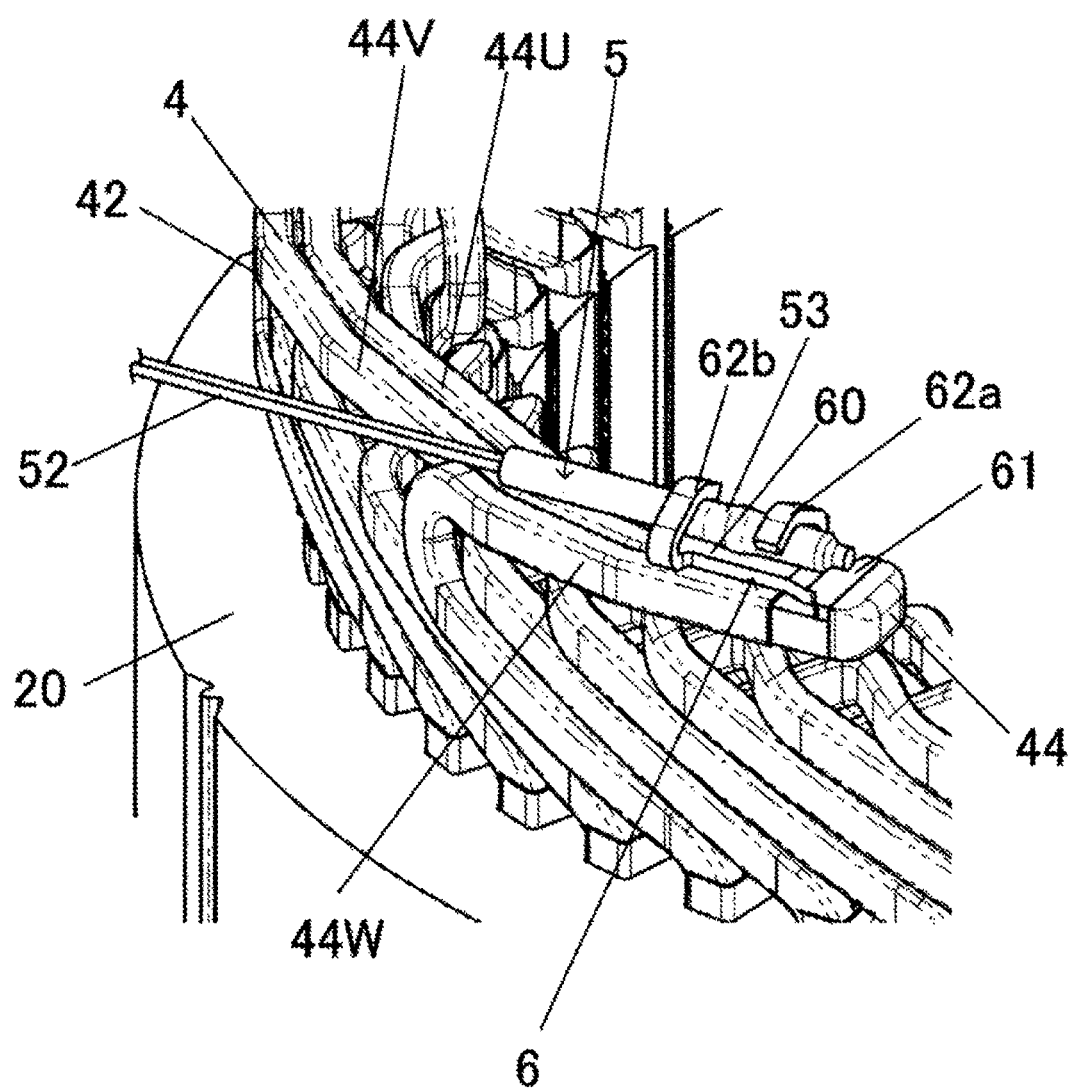
FIG. 4 is an enlarged view of an area IV of FIG. 2.
Figure 5A:
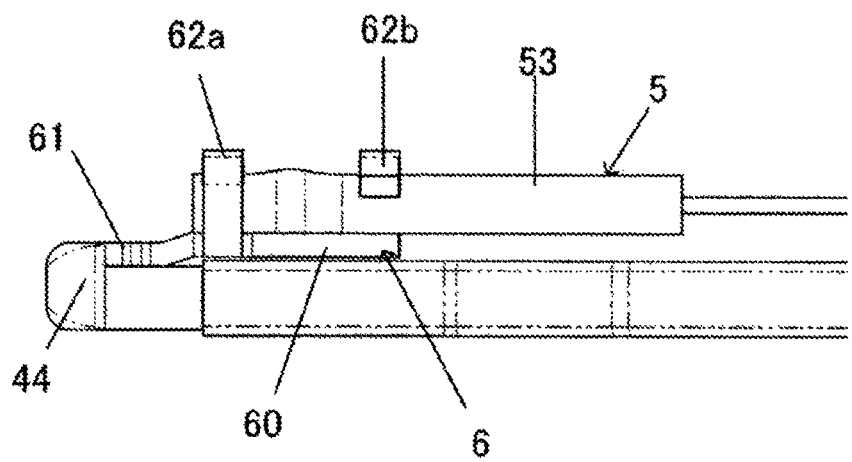
FIG. 5(A) is a side view of a fixing structure for a temperature detector illustrated in FIG. 4.
Figure 5B:
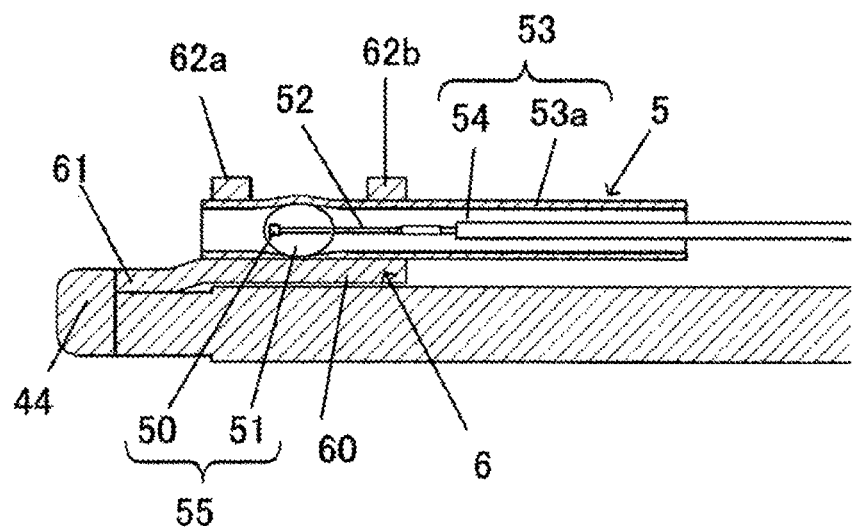
FIG. 5(B) is a schematic cross-sectional view of FIG. 5(A)
Figure 5C:
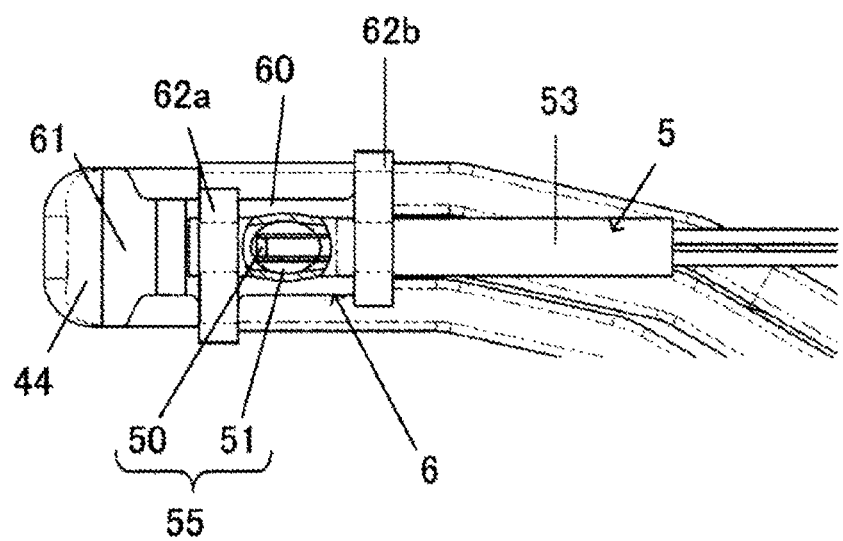
FIG. 5(C) is a top view of the fixing structure for a temperature detector.

FIG. 4 is an enlarged view of an area IV of FIG. 2, FIG. 5(A) is a side view of a fixing structure for the temperature detector illustrated in FIG. 4, FIG. 5(B) is a schematic cross-sectional view of FIG. 5(A), and FIG. 5(C) is a top view of the fixing structure for the temperature detector.

The stator windings 4 have upper surfaces on which the fixing member 6 is positioned to fix the temperature detector 5.

The fixing member 6 is formed of a member, such as metal, having excellent rigidity and excellent heat conductivity. The fixing member 6 includes a main body portion 60 having a plate shape, a joint portion 61 extending from one end of the main body portion 60, and a pair of front and rear crimped portions 62a and 62b provided at the main body portion 60 and spaced apart from each other. The front crimped portion 62a is provided near a boundary between the main body portion 60 and the joint portion 61. The rear crimped portion 62b is provided at the opposite end of the main body portion 60 to the front crimped portion 62a. Each of the front and rear side end portions 62a and 62b has a thin strip shape before crimping and is deformable into a bent shape. The front side end portion 62a and the rear side end portion 62b are separated from each other by a length larger than the length of the temperature detection element unit 55. The front and rear crimped portions 62a and 62b are crimped to constitute a clamp portion for clamping the temperature detector 5.

As illustrated in FIG. 4, the stator windings 4 include a U-phase neutral line 44U, a V-phase neutral line 44V, and a W-phase neutral line 44W, as coil ends of the respective phases. The neutral lines 44U, 44V, and 44W of U-phase, V-phase, and W-phase are circumferentially arranged on and along one end surface of the stator core 20 extending perpendicularly to the axis direction of the stator core 20. The neutral lines 44U, 44V, and 44W of U-phase, V-phase, and W-phase are joined at the neutral point 44 by welding or the like.

The joint portion 61 is joined at the ends of the neutral lines 44U, 44V, and 44W of U-phase, V-phase, and W-phase by welding or the like, and in such a state, the fixing member 6 is arranged on the upper sides of the neutral lines 44U, 44V, and 44W of U-phase, V-phase, and W-phase, in a circumferential direction along the neutral lines 44U, 44V, and 44W. The joint portion 61 of the fixing member 6 may be joined at the neutral point 44 together with the neutral lines 44U, 44V, and 44W of U-phase, V-phase, and W-phase. To join the fixing member 6 to the neutral lines 44U, 44V, and 44W of U-phase, V-phase, and W-phase by welding, the fixing member 6 preferably uses a material consisting of or including the same contents as those of the neutral lines 44U, 44V, and 44W.

Note that to join the fixing member 6 to the neutral lines 44U, 44V, and 44W of U-phase, V-phase, and W-phase, crimping may be employed instead of welding.

A method of fixing the temperature detector 5 of the fixing member 6 is described.

While the joint portion 61 of the fixing member 6 is fixed to the neutral lines 44U, 44V, and 44W of U-phase, V-phase, and W-phase, the temperature detector 5 is mounted on one side of the main body portion 60 of the fixing member 6. At this time, as illustrated in FIGS. 5(B) and 5(C), the temperature detection element unit 55 of the temperature detector 5 is positioned between the front crimped portion 62a and the rear crimped portion 62b, in a longitudinal direction in which the protection member 53 extends. That is, each of the front and rear crimped portions 62a and 62b as the clamp portion does not overlap on the temperature detection element unit 55.

In this state, the front and rear crimped portions 62a and 62b are wound on the outer periphery of the protection member 53, and crimped to press the protection member 53 against the main body portion 60 of the fixing member 6. Thus, as illustrated in FIGS. 5(A) to 5(C), the temperature detector 5 is held by the front and rear crimped portions 62a and 62b of the fixing member 6.

The first embodiment of the present invention has the following effects. (1) The temperature detection element unit 55 of the temperature detector 5 is positioned between the front crimped portion 62a and the rear crimped portion 62b in a longitudinal direction being a direction in which the protection member 53 extends, and the front and rear crimped portions 62a and 62b as the clamp portion do not overlap the temperature detection element unit 55. Thus, even if the main body portion 60 of the fixing member 6 is contracted by heat and compresses the temperature detector 5, a clamping force, that is, a holding force of the protection member 53 of the temperature detector 5 is increased, but no direct compressive load is applied to the temperature detection element unit 55. Accordingly, even if thermal expansion or contraction occurs in the fixing member 6, cracks or damage in the temperature detection element 50 or sealing member 51 can be suppressed. That is, mechanical effects on the temperature detection element unit 55 can be suppressed.

(2) The front and rear crimped portions 62a and 62b of the fixing member 6 compress or hold the protection member 53 of the temperature detector 5 by crimping or the like, and the temperature detector 5 is held while being pressed against the fixing member 6. Thus, even if the fixing member 6 is thermally expanded or contracted, the temperature detector 5 is always in contact with the fixing member 6. That is, even if the fixing member 6 is thermally expanded or contracted, no air gap leading to the increase of thermal resistance is generated between the stator windings 4, the fixing member 6, and the temperature detector 5, and excellent heat conductivity can be always ensured between the stator windings 4 and the temperature detector 5.

(3) The front and rear crimped portions 62a and 62b of the fixing member 6 compress and hold the temperature detector 5, while pressing the temperature detector 5 against the main body portion 60 of the fixing member 6 by crimping. Thus, even if an external load, such as vibration, is applied to the stator 2, a property of holding the temperature detector 5 is high and dropping-off or the like of the temperature detector 5 can be suppressed.

(4) The fixing member 6 and the neutral lines 44U, 44V, and 44W of U-phase, V-phase, and W-phase of the stator windings 4 are joined by welding. Thus, the change of temperature of the stator windings 4 is quickly transmitted to the temperature detector 5 via the fixing member 6.

(5) The temperature detector 5 is arranged on the upper sides of the neutral lines 44U, 44V, and 44W as the coil ends of U-phase, V-phase, and W-phase, in a circumferential direction along the neutral lines 44U, 44V, and 44W. Thus, the temperature detector 5 has a reduced height relative to a temperature detector 5 structured to be arranged in the axis direction of the stator core 20. Furthermore, in a structure in which the temperature detector 5 is arranged in the axis direction of the stator core 20, wires 52 of the temperature detector 5 need to be bent extremely to the neutral lines 44U, 44V, and 44W, but in the present embodiment, the bending is not required.

Second Embodiment

Figure 6:
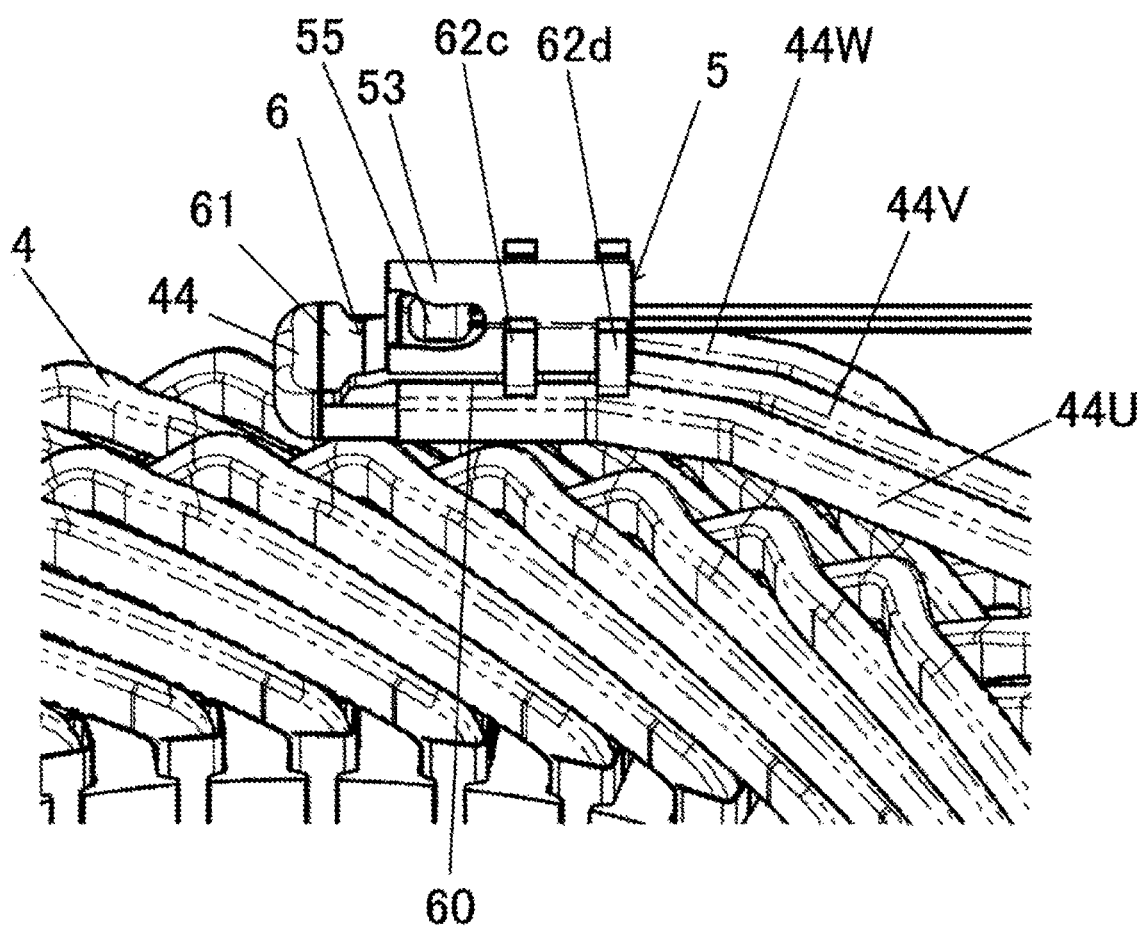
FIG. 6 is a perspective view of a second embodiment of the present invention.

FIG. 6 is a perspective view of a second embodiment of the present invention. FIG. 6 illustrates a state in which the protection member 53 of the temperature detector is partially removed, and the temperature detection element unit 55 is exposed.

The second embodiment has a structure in which the fixing member 6 is provided with a pair of crimped portions 62c and 62d, and both of the pair of crimped portions 62c and 62d are provided on the main body portion 60, in back of the temperature detection element unit 55.

As illustrated in FIG. 6, both of the pair of crimped portions 62c and 62d of the fixing member 6 are provided spaced apart from each other near the opposite end of the main body portion 60 to the joint portion 61. The crimped portion 62c is arranged near the temperature detection element unit 55, and the crimped portion 62d is arranged near the end of the main body portion 60. The temperature detection element unit 55 constituted by the temperature detection element 50 and the sealing member 51 is arranged in front of the crimped portion 62c so that the temperature detection element unit 55 does not overlap the crimped portion 62c.

The second embodiment shows an exemplary structure in which the joint portion 61 of the fixing member 6 is joined to the neutral point 44 to which the neutral phases 44U, 44V, and 44W of U-phase, V-phase, and W-phase are joined.

In the second embodiment, the other structures are similar to those of the first embodiment, and corresponding members are denoted by the same reference signs and description thereof will be omitted. The second embodiment also has the effects (1) to (5) of the first embodiment.

Third Embodiment

Figure 7A:
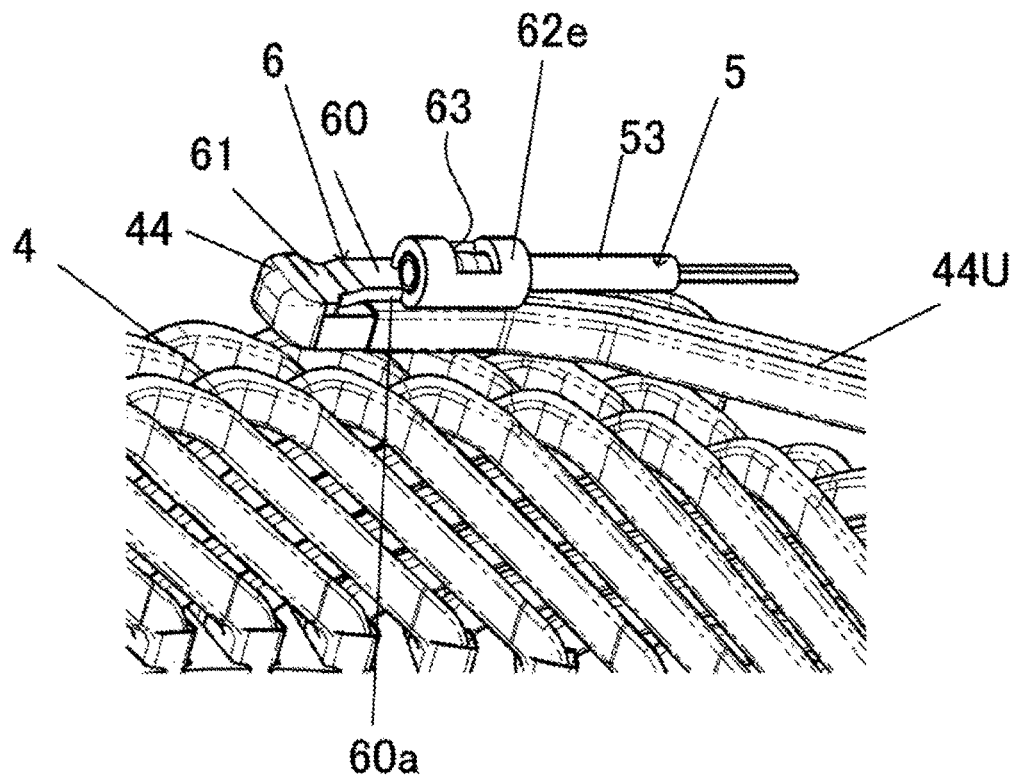
FIG. 7(A) is a perspective view of an area of a third embodiment of the present invention corresponding to the area of the first embodiment illustrated in FIG. 4.
Figure 7B:
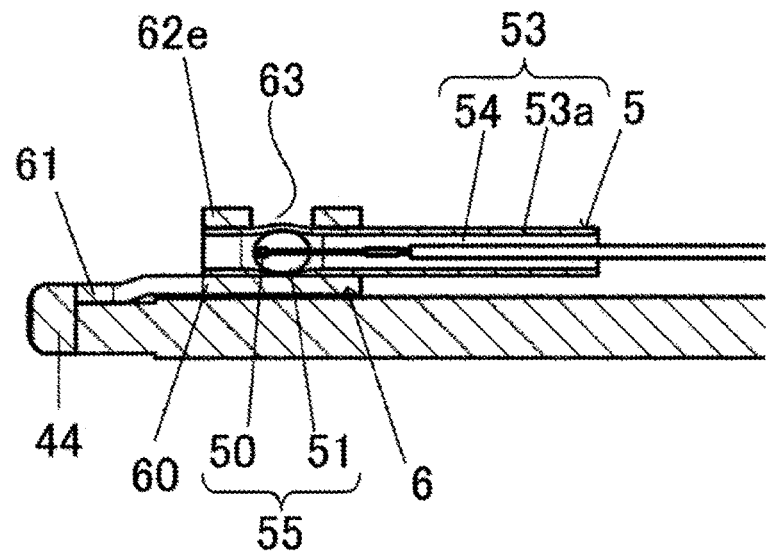
FIG. 7(B) is a schematic cross-sectional view of a fixing structure for a temperature detector illustrated in FIG. 7(A).

FIG. 7(A) is a perspective view of an area of a third embodiment of the present invention corresponding to the area of the first embodiment illustrated in FIG. 4, and FIG. 7(B) is a schematic cross-sectional view of a fixing structure for a temperature detector illustrated in FIG. 7(A).

The third embodiment includes a structure in which the fixing member 6 has a crimped portion 62e formed into a cylindrical shape having an inner hollow portion, and an opening portion 63 for exposing a portion of the protection member 55 corresponding to the temperature detection element unit 55 is formed in the crimped portion 62e. The opening portion 63 of the crimped portion 62e is positioned at substantially the center of the crimped portion 62e in a longitudinal direction.

The crimped portion 62e is formed deformable, having a thin thickness. To fix the temperature detector 5 to the fixing member 6, the temperature detector 5 is inserted into the hollow portion of the crimped portion 62e, and in such a state, the crimped portion 62e of cylindrical shape is flattened to secure the temperature detector 5. The crimped portion 62e is formed such that, for example, a rectangular portion extending from one side surface 60a of the main body portion 60 is provided, and the rectangular portion is bent into a round shape around an axis parallel to a longitudinal direction. The crimped portion 62e is preferably flattened toward the main body portion 60, in other words, downward from above. However, the crimped portion 62e may be flattened in a direction perpendicular to a vertical direction, or may be radially flattened uniformly. In short, the crimped portion 62e is desirably flattened in a direction crossing a longitudinal direction in which the protection member 53 extends. The temperature detection element unit 55 of the temperature detector 5 is set at a position corresponding to the opening portion 63 of the crimped portion 62e in the longitudinal direction, and the crimped portion 62e as the clamp portion does not overlap the temperature detection element unit 55.

In the third embodiment, the other structures are similar to those of the first embodiment, and corresponding members are denoted by the same reference signs and description thereof will be omitted.

The third embodiment also has the effects (1) to (5) of the first embodiment.

The third embodiment is similar to the first embodiment in structure in which the temperature detector 5 is clamped in front and back of the temperature detection element unit 55 by the crimped portion 62e. However, in the third embodiment, since the crimped portion 62e has a united member, crimping is required only once for excellent working efficiency.

Fourth Embodiment

Figure 8A:
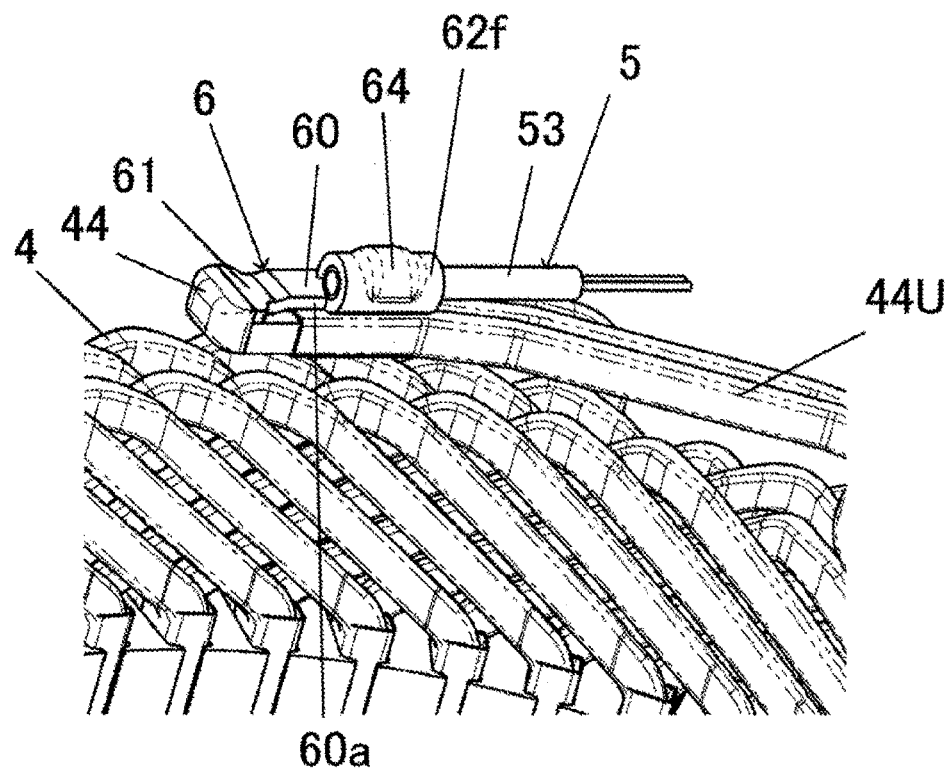
FIG. 8(A) is a perspective view of an area of a fourth embodiment of the present invention corresponding to the area of the first embodiment illustrated in FIG. 4.
Figure 8B:
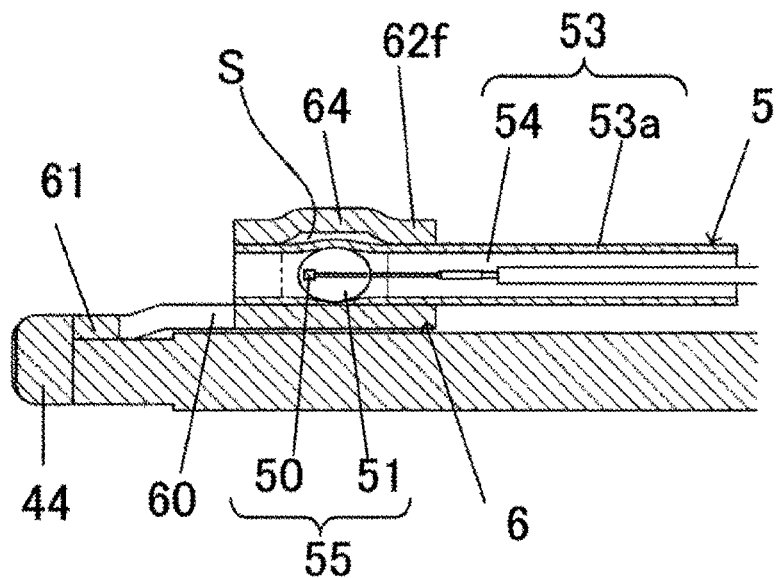
FIG. 8(B) is a schematic cross-sectional view of a fixing structure for a temperature detector illustrated in FIG. 8(A).

FIG. 8(A) is a perspective view of an area of a fourth embodiment of the present invention corresponding to the area of the first embodiment illustrated in FIG. 4, and FIG. 8(B) is a schematic cross-sectional view of a fixing structure for a temperature detector illustrated in FIG. 8(A). The fourth embodiment is similar to the third embodiment in that the fixing member 6 includes a crimped portion 62f having a cylindrical shape. However, the fourth embodiment includes a structure in which the crimped portion 62f does not include the opening portion 63 of the third embodiment, but includes a protrusion 64 radially protruding at substantially the center in a longitudinal direction. As illustrated in FIG. 8(B), the protrusion 64 of the crimped portion 62f protrudes toward a side opposite to the main body portion 60. The temperature detector 5 is secured by the fixing member 6 while the temperature detection element unit 55 is arranged in the area of the protrusion 64 of the crimped portion 62f in the longitudinal direction. In this state, an air gap S is formed between the temperature detector 5 and the protrusion 64 of the crimped portion 62f. That is, the crimped portion 62f of the fixing member 6 includes a clamp portion for clamping the protection member 53 of the temperature detector 5, and an opposed portion opposed to the protection member 53 to provide the air gap S between the opposed portion and the protection member 53, and the temperature detection element unit 55 is arranged at a position at which the temperature detection element unit 55 is opposed to the opposed portion across the air gap S.

The crimped portion 62f can be made by a method similar to that described in the third embodiment. However, the rectangular portion needs to be bent into a round shape after a recessed portion for forming the protrusion 64 is formed in the rectangular portion extending from the one side surface 60a of the main body portion 60.

To fix the temperature detector 5 to the fixing member 6 of the fourth embodiment, the temperature detector is inserted into the hollow portion of the crimped portion 62f. The temperature detector 5 is positioned so that the temperature detection element unit 55 corresponds to the protrusion 64 of the crimped portion 62f. Then, the crimped portion 62f is flattened at portions in front and back of the protrusion 64 in the longitudinal direction to secure the temperature detector 5. Thus, as illustrated in FIG. 8(B), a structure can be obtained in which the temperature detection element unit 55 of the temperature detector 5, arranged in the area of the protrusion 64 of the crimped portion 62f in the longitudinal direction, is secured by the fixing member 6.

In the fourth embodiment, the other structures are similar to those of the first embodiment, and corresponding members are denoted by the same reference signs and description thereof will be omitted.

The fourth embodiment also has the effects (1) to (5) of the first embodiment.

Furthermore, since the crimped portion 62f has a front portion and a rear portion united as one member across the temperature detection element unit 55 as in the third embodiment, excellent working efficiency is provided as in the third embodiment.

Note that in the fourth embodiment, a diameter of the hollow portion of the crimped portion 62f may be formed in a size large enough to loosely insert the temperature detector 5 in the longitudinal direction as a whole, flattening and crimping the portions of the crimped portion 62f corresponding to portions in front and back of the temperature detection element unit 55 while the temperature detector 5 is arranged in the hollow portion. According to this method, the crimped portion 62f can be readily formed inexpensively.

The temperature detectors 5 in the respective embodiments are by way of examples only, and another structure may be employed.

Figure 9A:
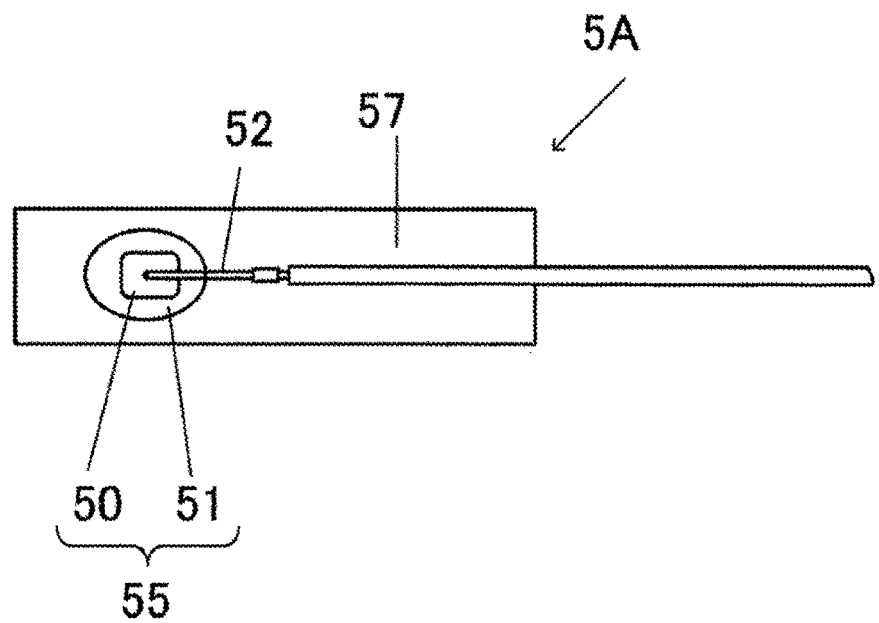
FIGS. 9(A) and 9(B) are each a schematic side cross-sectional view of a temperature detector according to a modification.
Figure 9B:
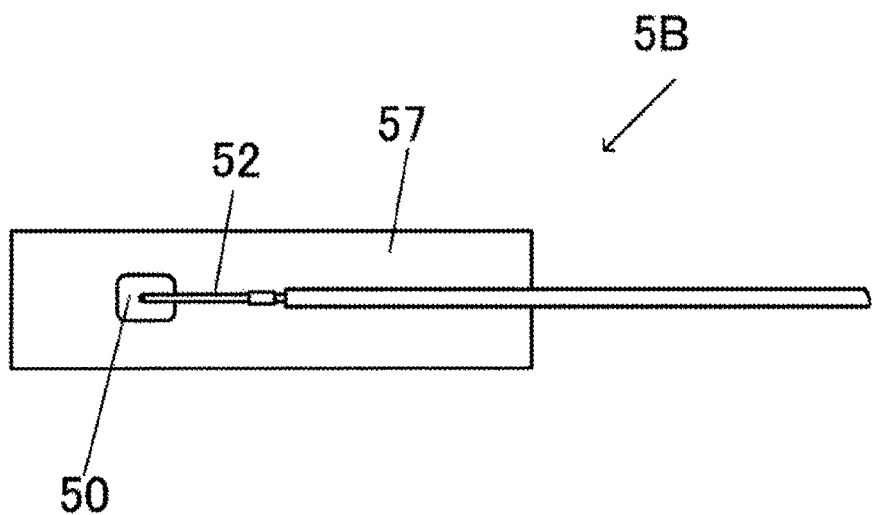

FIGS. 9(A) and 9(B) are each a schematic side cross-sectional view of a temperature detector according to a modification.

The temperature detector 5A illustrated in FIG. 9(A) includes the temperature detection element 50, the sealing member 51 for sealing the temperature detection element 50, the wire 52 connected to the temperature detection element 50, and a protection member 57 for covering the sealing member 51 and the wire 52. The temperature detection element 50 and the sealing member 51 constitute the temperature detection element unit 55. The temperature detector 5A is different from the temperature detector 5 illustrated in FIG. 3, in that the protection member 57 does not include the insulation cover 53a and is made of only resin.

The temperature detector 5B illustrated in FIG. 9(B) includes the temperature detection element 50, the wire 52 connected to the temperature detection element 50, and a protection member 57 for covering the temperature detection element 50 and the wire 52. The temperature detector 5B is different from the temperature detector 5A in that the sealing member 51 for sealing the temperature detection element 50 is not provided. That is, in the temperature detector 5B, the temperature detection element 50 constitutes the temperature detection element unit 55. Since the temperature detector 5B does not include the sealing member 51, there is no crack or damage in the sealing member 51. Thus, when the temperature detector 5B is used, the crimped portions 62a to 62f are arranged at positions at which the crimped portions 62a to 62f do not overlap the temperature detection element 50 in the longitudinal direction of the protection members 53 and 57.

The various embodiments and modifications have been described above, but the present invention is not limited to the contents thereof. The other embodiments conceivable within the technical scope of the present invention are also included in the scope of the present invention.

REFERENCE SIGNS LIST 1 rotary electric machine
2 stator
4 stator winding
5, 5A, 5B temperature detector
6 fixing member
44 neutral point
44U U-phase neutral line
44V V-phase neutral line
44W W-phase neutral line
50 temperature detection element
51 sealing member
53 protection member
53a insulation cover
54 resin
55 temperature detection element unit
57 protection member
62a front crimped portion
62b rear crimped portion
62c to 62f crimped portion
63 opening portion
S air gap

The invention claimed is:

1. A stator for a rotary electric machine comprising:
a stator coil;
a temperature detector which includes a temperature detection element;
a protection member which extends in a longitudinal direction to cover the temperature detector, the protection member including a first side extending along the longitudinal direction which faces the stator coil and a second side extending along the longitudinal direction opposite the first side; and
a fixing member which serves as a positioning mechanism for the temperature detector with respect to the stator coil,
wherein the fixing member includes a first clamp portion which fixes the first side of the protection member against the fixing member towards the stator coil and a second clamp portion,
wherein the first clamp portion at least partially surrounds the protection member in a direction crossing the longitudinal direction of the protection member and spans a portion of the first side and a portion of the second side, to clamp the protection member at a position where the first clamp portion does not overlap the temperature detector in the longitudinal direction of the protection member and the first side of the protection member is in direct contact with the fixing member, and the first clamp portion and the second clamp portion form an exposure space which exposes the temperature detector between the first clamp portion and the second clamp portion,
wherein the stator coil includes neutral lines which are circumferentially arranged on an end surface of a stator core extending perpendicular to an axial direction of the stator core, the temperature detector being arranged in a circumferential direction along the neutral lines, and
wherein the neutral lines are joined to a neutral point of the stator coil, the fixing member is connected to the neutral line, and the fixing member includes a joint portion joined at the neutral point to the neutral lines.

2. The stator for a rotary electric machine according to claim 1, wherein
the temperature detector includes a sealing member which covers the temperature detector, and
the protection member includes a resin which covers the sealing member, and an insulation cover which covers the resin.

3. The stator for a rotary electric machine according to claim 1, wherein
the fixing member is arranged at a coil end of the stator coil in a circumferential direction.

4. The stator for a rotary electric machine according to claim 1, wherein
the first clamp portion includes an opening portion at a position at which the first clamp portion is opposed to the temperature detector.

5. A rotary electric machine comprising the stator according to claim 1.

6. A stator for a rotary electric machine comprising:
a stator coil;
a temperature detector;
a protection member which covers the temperature detector and includes a first side extending along a longitudinal direction of the protection member which faces the stator coil and a second side extending along the longitudinal direction opposite the first side; and
a fixing member which serves as a positioning mechanism for the temperature detector with respect to the stator coil,
wherein the fixing member includes a clamp portion which at least partially surrounds the protection member in a direction crossing the longitudinal direction of the protection member and spans a portion of the first side and a portion of the second side, to clamp the protection member, and an opposed portion which is opposed to the protection member to provide an air gap between the opposed portion and the protection member, and
wherein the temperature detector is disposed at a position at which the temperature detector is opposed to the opposed portion across the air gap and the first side of the protection member is in direct contact with the fixing member,
wherein the stator coil includes neutral lines which are circumferentially arranged on an end surface of a stator core extending perpendicular to an axial direction of the stator core, the temperature detector being arranged in a circumferential direction along the neutral lines, and
wherein the neutral lines are joined to a neutral point of the stator coil, the fixing member is connected to the neutral line, and the fixing member includes a joint portion joined at the neutral point to the neutral lines.

* * * * *